United States Patent
Cravener et al.

(10) Patent No.: US 10,472,059 B2
(45) Date of Patent: Nov. 12, 2019

(54) INBOARD BEARING ASSEMBLIES FOR PROPROTOR SYSTEMS

(71) Applicant: Bell Helicopter Textron Inc., Fort Worth, TX (US)

(72) Inventors: Kyle Thomas Cravener, Fort Worth, TX (US); Amarjit Kizhakkepat, Fort Worth, TX (US); Ken Shundo, Fort Worth, TX (US); Jared Mark Paulson, Fort Worth, TX (US); Tyler Wayne Baldwin, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 383 days.

(21) Appl. No.: 15/648,650

(22) Filed: Jul. 13, 2017

(65) Prior Publication Data
US 2019/0016454 A1    Jan. 17, 2019

(51) Int. Cl.
| | |
|---|---|
| B64C 27/35 | (2006.01) |
| B64C 29/00 | (2006.01) |
| F16C 23/04 | (2006.01) |
| F16C 27/02 | (2006.01) |
| F16C 33/20 | (2006.01) |

(52) U.S. Cl.
CPC ........ *B64C 29/0033* (2013.01); *F16C 23/045* (2013.01); *F16C 27/02* (2013.01); *F16C 33/203* (2013.01); *F16C 2326/43* (2013.01)

(58) Field of Classification Search
CPC .......... B64C 27/35; B64C 27/54; B64C 27/51
See application file for complete search history.

(56) References Cited

U.S. PATENT DOCUMENTS

| | | | | |
|---|---|---|---|---|
| 4,028,002 | A | * | 6/1977 | Finney .................... B64C 27/35 416/134 A |
| 4,257,739 | A | * | 3/1981 | Covington .............. B64C 27/35 416/134 A |
| 4,430,045 | A | * | 2/1984 | Cresap .................. B64C 27/001 244/17.27 |
| 5,186,686 | A | | 2/1993 | Staples et al. |
| 5,316,442 | A | * | 5/1994 | Mouille .................. B64C 27/35 416/134 A |
| 5,601,408 | A | | 2/1997 | Hunter et al. |
| 5,620,305 | A | | 4/1997 | McArdle |
| 6,007,298 | A | | 12/1999 | Karem |
| 6,296,444 | B1 | | 10/2001 | Schellhase et al. |
| 6,641,365 | B2 | | 11/2003 | Karem |
| 8,226,355 | B2 | | 7/2012 | Stamps et al. |

(Continued)

*Primary Examiner* — Brian M O'Hara
(74) *Attorney, Agent, or Firm* — Lawrence Youst PLLC

(57) ABSTRACT

A proprotor system for a tiltrotor aircraft having a helicopter flight mode and an airplane flight mode. The proprotor system includes a yoke having a plurality of blade arms with inboard pockets. A centrifugal force and shear bearing assembly is disposed in each of the inboard pockets of the yoke. Each of a plurality of proprotor blades is coupled to the yoke by one of the bearing assemblies such that each proprotor blade has a pitch change degree of freedom about a pitch change axis and a tilting degree of freedom about a focal point. Each bearing assembly includes a centrifugal force bearing coupled to the yoke, a shear bearing coupled to the yoke and an inboard beam coupled between the centrifugal force bearing and the shear bearing. Each inboard beam is coupled to a respective proprotor blade.

19 Claims, 6 Drawing Sheets

(56) References Cited

U.S. PATENT DOCUMENTS

| | | | |
|---|---|---|---|
| 8,231,346 B2 * | 7/2012 | Stamps | F16F 1/40 |
| | | | 416/134 A |
| 9,090,344 B2 * | 7/2015 | Stucki | B64C 27/48 |
| 9,126,680 B2 | 9/2015 | Stamps et al. | |
| 9,254,915 B2 | 2/2016 | Stamps | |
| 9,656,747 B2 * | 5/2017 | Shundo | B64C 11/02 |
| 2013/0105637 A1 | 5/2013 | Stamps et al. | |
| 2014/0248150 A1 | 9/2014 | Sutton et al. | |

* cited by examiner

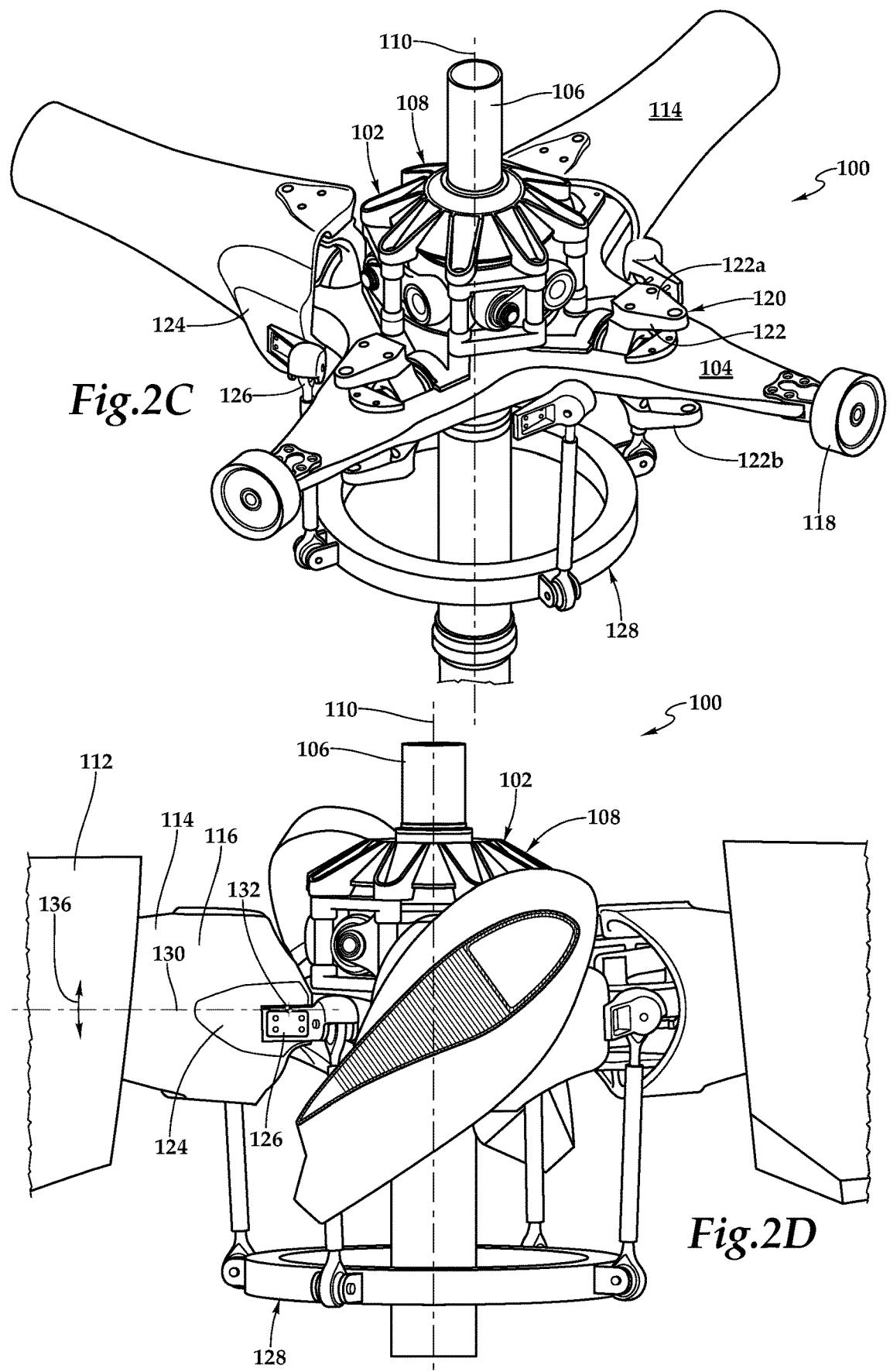

INBOARD BEARING ASSEMBLIES FOR PROPROTOR SYSTEMS

TECHNICAL FIELD OF THE DISCLOSURE

The present disclosure relates, in general, to proprotor systems operable for use on tiltrotor aircraft having a helicopter flight mode and an airplane flight mode and, in particular, to centrifugal force and shear bearing assemblies disposed in inboard pockets of a yoke for stiff-in-plane proprotor systems.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor system including a hub assembly and a plurality of proprotor blades. Typically, at least a portion of each propulsion assembly is rotatable relative to the fixed wing such that the proprotor blades have a generally horizontal plane of rotation providing vertical lift for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter flight mode and the airplane flight mode, which may be referred to as conversion flight mode.

Physical structures have natural frequencies of vibration that can be excited by forces applied thereto as a result of operating parameters and/or environmental conditions. These frequencies are determined, at least in part, by the materials and geometrical dimensions of the structures. In the case of tiltrotor aircraft, certain structures having critical natural frequencies include the fuselage, the fixed wing and various elements of the propulsion assemblies. One important operating parameter of a tiltrotor aircraft is the angular velocity or revolutions per minute (RPM) of the proprotor blades, which may generate excitation frequencies corresponding to 1/rev (1 per revolution), 2/rev, 3/rev, etc. In general, proprotor systems for tiltrotor aircraft should be designed to achieve blade flap or out-of-plane frequencies and lead-lag or in-plane frequencies that are sufficiently distant from these excitation frequencies. For example, certain tiltrotor aircraft have stiff-in-plane proprotor systems with the lead-lag frequency above 1.0/rev, such as between 1.4/rev and 1.6/rev. For each proprotor blade, such stiff-in-plane proprotor systems have utilized three independent shear bearings in series and a centrifugal force bearing positioned outboard of the yoke and within the proprotor blade. It has been found, however, that this design prevents heat dissipation from the centrifugal force bearings during operations. In addition, this design precludes visual inspection of the centrifugal force bearings without blade removal. Further, this design obstructs compact blade fold options that can reduce the overall tiltrotor aircraft footprint during storage.

SUMMARY

In a first aspect, the present disclosure is directed to a proprotor system for a tiltrotor aircraft having a helicopter flight mode and an airplane flight mode. The proprotor system includes a yoke having a plurality of blade arms each having an inboard pocket. A centrifugal force and shear bearing assembly is disposed in each of the inboard pockets of the yoke. Each of a plurality of proprotor blades is coupled to the yoke by one of the centrifugal force and shear bearing assemblies such that each proprotor blade has a pitch change degree of freedom about a pitch change axis and a tilting degree of freedom about a focal point.

In certain embodiments, the proprotor system may include a plurality of shear bearings each disposed at an outboard end of one of the blade arms of the yoke. In some embodiments, the yoke may include at least three blade arms, at least four blade arms or other number of blade arms. In certain embodiments, each centrifugal force and shear bearing assembly may include a centrifugal force bearing coupled to the yoke, a shear bearing coupled to the yoke and an inboard beam coupled between the centrifugal force bearing and the shear bearing. In some embodiments, the centrifugal force bearing may be positioned outboard of the shear bearing. In certain embodiments, the inboard beam may be coupled to the respective proprotor blade and may be operable to rotate relative to the yoke about the respective pitch change axis. In some embodiments, the centrifugal force bearings may include an outboard member coupled to the yoke and having a concave spherical surface, an inboard member coupled to the inboard beam and having a convex spherical surface and a series of spherical elastomeric layers separated by inelastic shims between the outboard member and the inboard member. In such embodiments, the inboard member may be operable to rotate relative to the outboard member responsive to rotation of the inboard beam about the respective pitch change axis.

In certain embodiments, the shear bearings may include a radially inwardly disposed journal bearing coupled to the inboard beam and a radially outwardly disposed spherical bearing providing a tilting degree of freedom for the inboard beam relative to the yoke. In such embodiments, the radially inwardly disposed journal bearing may be operable to rotate relative to the radially outwardly disposed spherical bearing responsive to rotation of the inboard beam about the respective pitch change axis. In some embodiments, the centrifugal force bearing may be coupled to the shear bearing. In certain embodiments, a first in-plane frequency of the proprotor system may be greater than 1.0/rev. For example, the first in-plane frequency of the proprotor system may be between about 1.2/rev and about 1.8/rev. As another example, the first in-plane frequency of the proprotor system may be between about 1.4/rev and about 1.6/rev.

In a second aspect, the present disclosure is directed to a tiltrotor aircraft having a helicopter flight mode and an airplane flight mode. The tiltrotor aircraft includes a fuselage, a wing extending from the fuselage having first and second outboard ends, first and second pylon assemblies respectively coupled to the wing proximate the first and second outboard ends and first and second proprotor systems operably associated respectively with the first and second pylon assemblies. Each proprotor system includes a yoke having a plurality of blade arms each having an inboard pocket. A centrifugal force and shear bearing assembly is disposed in each of the inboard pockets of the yoke. Each of a plurality of proprotor blades is coupled to the yoke by one of the centrifugal force and shear bearing assemblies such that each proprotor blade has a pitch change degree of freedom about a pitch change axis and a tilting degree of freedom about a focal point.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2D are various views of a proprotor system having centrifugal force and shear bearing assemblies disposed in inboard pockets of a yoke for use on a tiltrotor aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
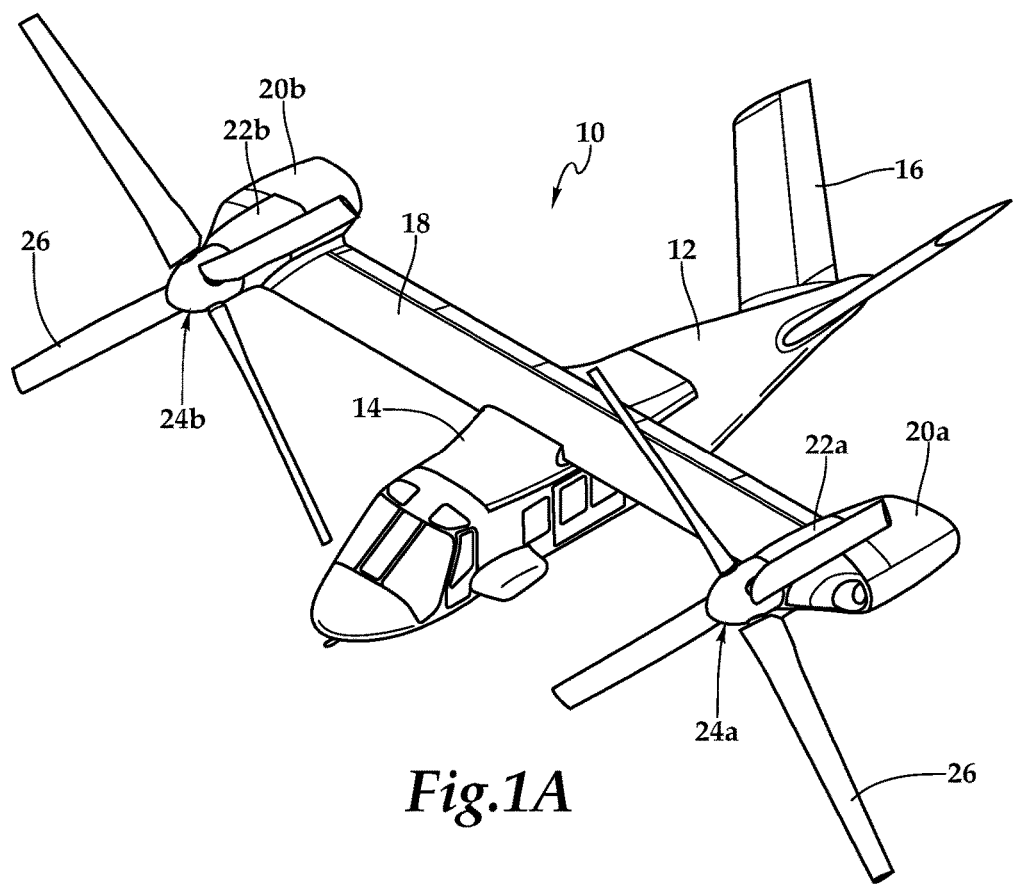
FIGS. 1A-1B are schematic illustrations of a tiltrotor aircraft in an airplane flight mode and a helicopter flight mode, respectively, in accordance with embodiments of the present disclosure.
Figure 1B:
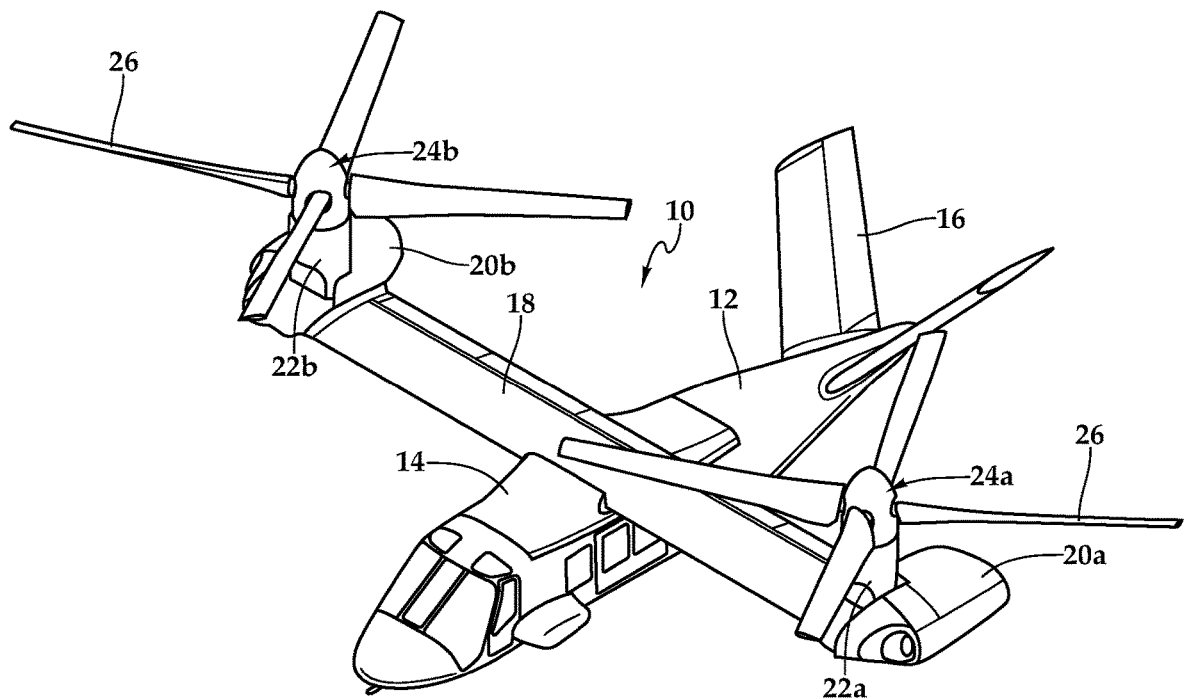
Figure 2A:
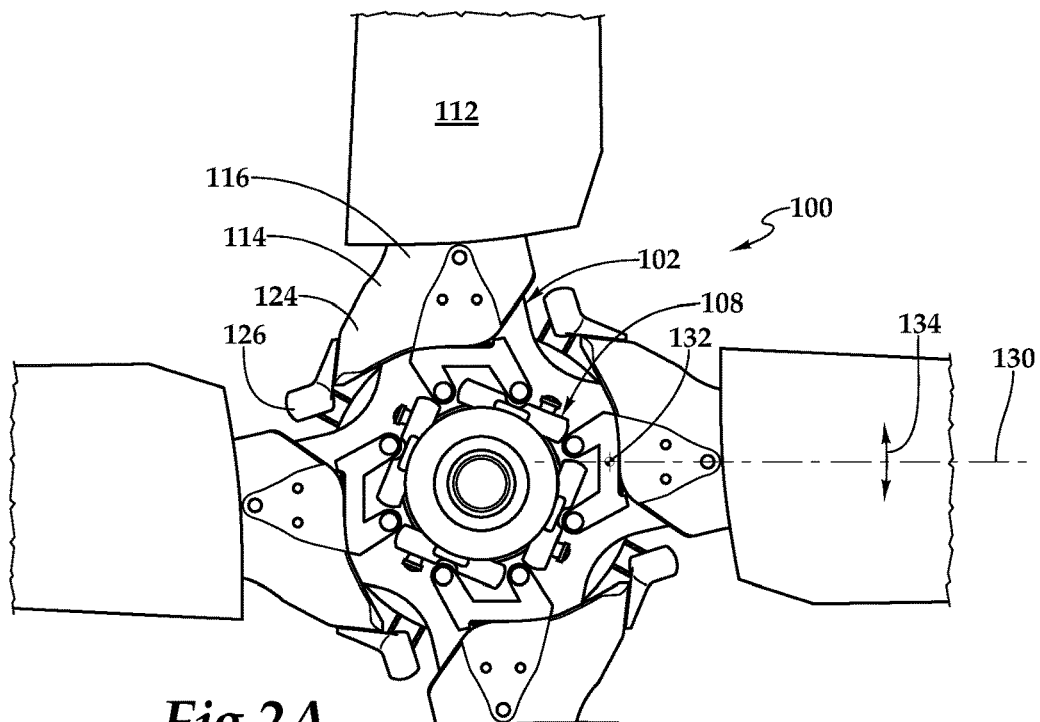
Figure 2B:
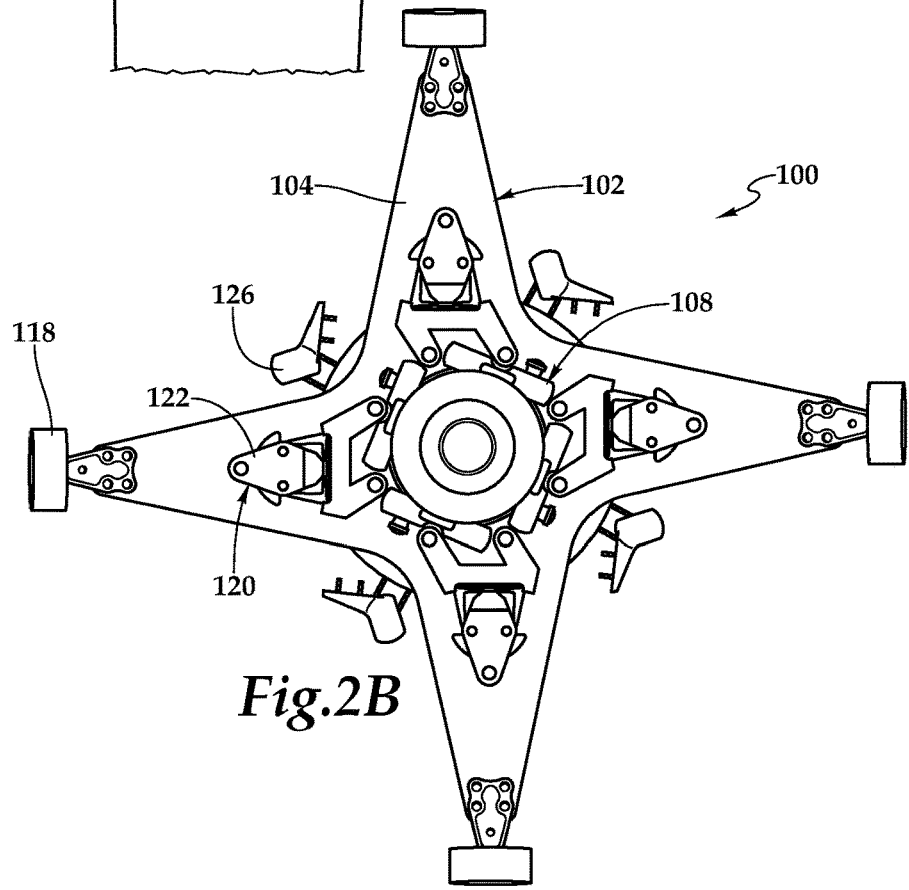

Referring to FIGS. 1A and 1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are fixed nacelles 20a, 20b, each of which may house a drive system including an engine and a fixed portion of a transmission. A pylon assembly 22a is rotatable relative to fixed nacelle 20a and wing 18 between a generally horizontal orientation, as best seen in FIG. 1A, a generally vertical orientation, as best seen in FIG. 1B. Pylon assembly 22a may include a tilting portion of the transmission and a proprotor system 24a that is rotatable responsive to torque and rotational energy provided via the drive system. Likewise, a pylon assembly 22b is rotatable relative to fixed nacelle 20b and wing 18 between a generally vertical orientation, as best seen in FIG. 1A, a generally horizontal orientation, as best seen in FIG. 1B. Pylon assembly 22b may include a tilting portion of the transmission and a proprotor system 24b that is rotatable responsive to torque and rotational energy provided via the drive system. In the illustrated embodiment, proprotor systems 24a, 24b each include four proprotor blades 26. It should be understood by those having ordinary skill in the art, however, that proprotor assemblies 24a, 24b could alternatively have a different number of proprotor blades, either less than or greater than four. In addition, it should be understood that the position of pylon assemblies 22a, 22b, the angular velocity or revolutions per minute (RPM) of the proprotor systems 24a, 24b, the pitch of proprotor blades 26 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor systems 24a, 24b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 24a, 24b are positioned to rotate in a substantially horizontal plane to provide a vertical lift such that tiltrotor aircraft 10 flies much like a conventional helicopter. During operation, tiltrotor aircraft 10 may convert from helicopter flight mode to airplane flight mode following vertical takeoff and may convert back to helicopter flight mode from airplane flight mode for hover and vertical landing. In addition, tiltrotor aircraft 10 can perform certain flight maneuvers with proprotor systems 24a, 24b positioned between airplane flight mode and helicopter flight mode, which can be referred to as conversion flight mode.

Each fixed nacelle 20a, 20b may house a drive system including an engine and transmission for supplying torque and rotational energy to a respective proprotor system 24a, 24b. In such embodiments, the drive systems of each fixed nacelle 20a, 20b may be coupled together via one or more drive shafts located in wing 18 such that either drive system can serve as a backup to the other drive system in the event of a failure. Alternatively or additionally, a drive system including an engine and transmission may be located in fuselage 12 for providing torque and rotational energy to both proprotor systems 24a, 24b via one or more drive shafts located in wing 18. In tiltrotor aircraft having drive systems in both the nacelles and fuselage, the fuselage mounted drive system may serve as a backup in the event of failure of either or both of the nacelle mounted drive systems.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, operating in airplane flight mode typically requires less thrust than operating in helicopter flight mode. One way to reduce thrust as well as increase endurance, reduce noise levels and reduce fuel consumption is to reduce the operating speed of the proprotor systems. For example, in helicopter flight mode, the tiltrotor aircraft may operate at 100 percent of design RPM, but in airplane flight mode, the tiltrotor aircraft may operate at a reduced percent of design RPM such as between about 80 percent and about 90 percent of design RPM. Thus, to achieve desirable rotor dynamics, the proprotor systems for tiltrotor aircraft should be designed to avoid the frequencies of 1/rev, 2/rev, 3/rev, etc. for both helicopter flight mode and airplane flight mode operations.

In the illustrated embodiment, each proprotor system 24a, 24b includes four proprotor blades 26 that are positioned circumferentially about a hub assembly at ninety-degree intervals. Proprotor blades 26 and the hub assembly are preferably designed to have sufficient stiffness to achieve a first-in-plane frequency above 1.0/rev. In some embodiments, the first in-plane frequency of proprotor blades 26 may preferably be in a range between about 1.2/rev and about 1.8/rev and more preferably in a range between about 1.4/rev and about 1.6/rev. As another example, proprotor blades 26 and the hub assembly may be designed to have sufficient stiffness to achieve a first-in-plane frequency above 2.0/rev. For example, the first in-plane frequency of proprotor blades 26 may be in a range between about 2.0/rev and about 3.0/rev. In such embodiments, the first in-plane frequency of proprotor blades 26 may preferably be in a range between about 2.2/rev and about 2.8/rev and more preferably in a range between about 2.4/rev and about 2.6/rev.

The desired proprotor blade stiffness and/or stiffness to mass ratio of the present embodiments is achieved using, for example, carbon-based materials for the structural components of proprotor blades 26 such as graphite-based materials, graphene-based materials or other carbon allotropes including carbon nanostructure-based materials such as materials including single-walled and multi-walled carbon nanotubes. In one example, the spar and/or skin of proprotor blades 26 are preferably monolithic structures formed using a broad goods and/or layered tape construction process having a manual or automated layup of a plurality of composite broad goods material layers including carbon fabrics, carbon tapes and combinations thereof, positioned over one or more mandrels having simple geometric surfaces with smooth transitions. After curing and other processing steps, the material layers form a high strength, lightweight solid composite members. In this process, the material thicknesses of the components can be tailoring spanwise and chordwise to the desired stiffness and/or stiffness to mass ratio. The proprotor blade components may be composed of up to about 50 percent, about 60 percent, about 70 percent, about 80 percent, about 90 percent or more of the carbon-based material or materials.

Referring next to FIGS. 2A-2D in the drawings, a proprotor system for tiltrotor aircraft is depicted and generally designated 100. In the illustrated embodiment, proprotor system 100 includes a hub assembly 102 including a yoke 104 that is coupled to a mast 106 via a constant velocity joint assembly 108. Hub assembly 102 rotates with mast 106, which is coupled to a drive system including an engine and transmission of the tiltrotor aircraft that provides torque and rotational energy to proprotor system 100. Constant velocity joint assembly 108 provides a gimballing degree of freedom for yoke 104 relative to mast 106 enabling yoke 104 to teeter in any direction relative to the rotational axis 110 of proprotor system 100. Accordingly, hub assembly 102 may be referred to as a gimbaled hub. In the illustrated implementation, constant velocity joint assembly 108 is positioned above the rotational plane of yoke 104 and is mounted on and/or coupled to an upper surface of yoke 104. As illustrated, yoke 104 includes four blade arms each of which holds and supports a proprotor blade 112. Each proprotor blade 112 includes a spar 114 that extends spanwise toward the tip of proprotor blade 112. Spars 114 are preferably the main structural members of proprotor blades 112 designed to carry the primary centrifugal and bending loads of proprotor blades 112. Spars 114 may have a root-to-tip twist on the order of about 30 degrees to about 40 degrees or other suitable root-to-tip twist.

Each spar 114 has a root section that couples of each proprotor blade 112 with hub assembly 102 via an outboard shear bearing 118 and an inboard centrifugal force and shear bearing assembly 120. Each shear bearing assembly 118 is coupled to an outboard end of yoke 104 with a plurality of connecting members such as bolts, pins or the like. Likewise, each centrifugal force and shear bearing assembly 120 is coupled to an inboard station of yoke 104 with a plurality of connecting members such as bolts, pins or the like. Each centrifugal force and shear bearing assembly 120 includes a rotatably mounted inboard beam 122 having upper and lower arms 122a, 122b. As illustrated, each spar 114 is coupled to a respective inboard beam 122 at upper and lower arms 122a, 122b with a plurality of connecting members such as bolts, pins or the like. In addition, each spar 114 is coupled to a respective shear bearing assembly 118 via a suitable connection (not visible). Each proprotor blade 112 has a centrifugal force retention load path through centrifugal force and shear bearing assembly 120 to yoke 104. In the illustrated embodiment, each spar 114 includes an integral pitch horn 124 on the leading edge of spar 114 that is coupled to a leading edge pitch link 126 of a pitch control assembly 128 depicted as the rotating portion of a rise and fall swash plate operable to collectively and cyclically control the pitch of proprotor blades 112. In other embodiments, the pitch horns may be independent components coupled to the spars, the pitch horns may be trailing edge pitch horns and/or the pitch links may be trailing edge pitch links. Each proprotor blade 112 has an independent pitch change degree of freedom relative to hub assembly 102 about a pitch change axis 130. The pitch change of each proprotor blade 112 is controlled responsive to changes in position of pitch links 126 and pitch control assembly 128. Rotation of each proprotor blade 112 causes the respective inboard beam 122 to rotate relative to yoke 104 about the respective pitch change axis. Each proprotor blade 112 has an independent tilting degree of freedom relative to hub assembly 102 about a focal point 132 that is coincident with pitch change axis 130. For example, each proprotor blade 112 is operable to tilt relative to hub assembly 102 with lead-lag motion, as indicated by arrow 134 in FIG. 2A, and with flapping motion, as indicated by arrow 136 in FIG. 2D.

Referring additionally to FIGS. 3A-3E in the drawings, therein are depicted various views of a proprotor system 200 of the present disclosure. Proprotor system 200 includes a yoke 202 depicted as having three blade arms each including an inboard pocket 204. As discussed herein, a yoke of the present disclosure could have any number of blade arms corresponding to the desired number of proprotor blades in a particular implementation including yoke designs having at least three blade arms, at least four blade arms or other suitable number of blade arms. Yoke 202 may be formed from composite materials including numerous material plies composed of continuous filaments, fibers and/or sheets. The composite materials may include one or more of carbon, graphite, glass, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. After curing, yoke 202 may require a variety of finishing steps including material removal processes such as machining operations to shape the surface of yoke 202 and to form inboard pockets 204 as well as other openings in yoke 202.

A centrifugal force and shear bearing assembly 206 is disposed in each of the inboard pockets 204 of yoke 202, for clarity of illustration, only one such centrifugal force and shear bearing assembly 206 is shown in FIGS. 3A-3E. Centrifugal force and shear bearing assembly 206 includes a centrifugal force bearing 208, a shear bearing 210 and an inboard beam 212. In the illustrated embodiment, centrifugal force bearing 208 includes an inboard member 208a having a convex spherical outboard surface and an outboard member 208b having a concave spherical inboard surface. Disposed between inboard member 208a and outboard member 208b is a bearing element 208c that includes a series of spherical elastomeric layers separated by inelastic shims. The connections within bearing element 208c and between bearing element 208c and inboard member 208a and outboard member 208b are permanent and may be made by vulcanizing the elastomeric material of bearing element 208c to the adjacent surfaces or by bonded, adhered or otherwise secured the elastomeric material in a non-removable manner to these surfaces. The durometer and thickness of the materials as well as the stiffness, softness and/or spring rate of centrifugal force bearing 208 may be tailored to achieve the desired operational modes based upon the loads and motions expected in the particular application. In operation, each centrifugal force bearing 208 is operable to provide a centrifugal force retention load path from a proprotor blade 112 to yoke 202. In the illustrated embodiment, centrifugal force bearing 208 includes a lower flange 208d that is bolted, pinned or otherwise coupled to a lower surface of outboard member 208b once centrifugal force bearing 208 is disposed in an inboard pocket 204. Centrifugal force bearing 208 is coupled to the outboard end of inboard pocket 204 using bolts, pins or other suitable technique.

In the illustrated embodiment, shear bearing 210 includes a radially inwardly disposed journal bearing 210a and a radially outwardly disposed spherical bearing 210b. Journal bearing 210a including a series of cylindrical elastomeric layers separated by inelastic shims. Spherical bearing 210b including a series of spherical elastomeric layers separated by inelastic shims. The connections within journal bearing 210a and spherical bearing 210b are permanent and may be made by vulcanizing the elastomeric material directly on adjacent surfaces or by bonded, adhered or otherwise secured the elastomeric material in a non-removable manner to these surfaces. The durometer and thickness of the materials as well as the stiffness, softness and/or spring rate of journal bearing 210a and spherical bearing 210b may be tailored to achieve the desired operational modes based upon the loads and motions expected in the particular application. In the illustrated embodiment, shear bearing 210 is coupled to yoke 202 with a pair of clamp plates 214a, 214b using bolts, pins or other suitable technique.

In the illustrated embodiment, inboard beam 212 includes upper and lower arms 212a, 212b. Inboard beam 212 receives centrifugal force bearing 208 in an opening 212c such that centrifugal force bearing 208 is housed within inboard beam 212. In addition, a boss 208e extending from inboard member 208a of centrifugal force bearing 208 is received within an anti-rotation cavity 212d of inboard beam 212 to couple centrifugal force bearing 208 to inboard beam 212. An inboard extension 212e of inboard beam 212 is received in an opening 210c of shear bearing 210. In addition, a boss 212f of inboard extension 212e is received within an anti-rotation element 210d of shear bearing 210 to couple shear bearing 210 to inboard beam 212. In the illustrated embodiment, centrifugal force bearing 208 and shear bearing 210 are coupled together with a bolt 216a and washer 216b.

Figure 3A:
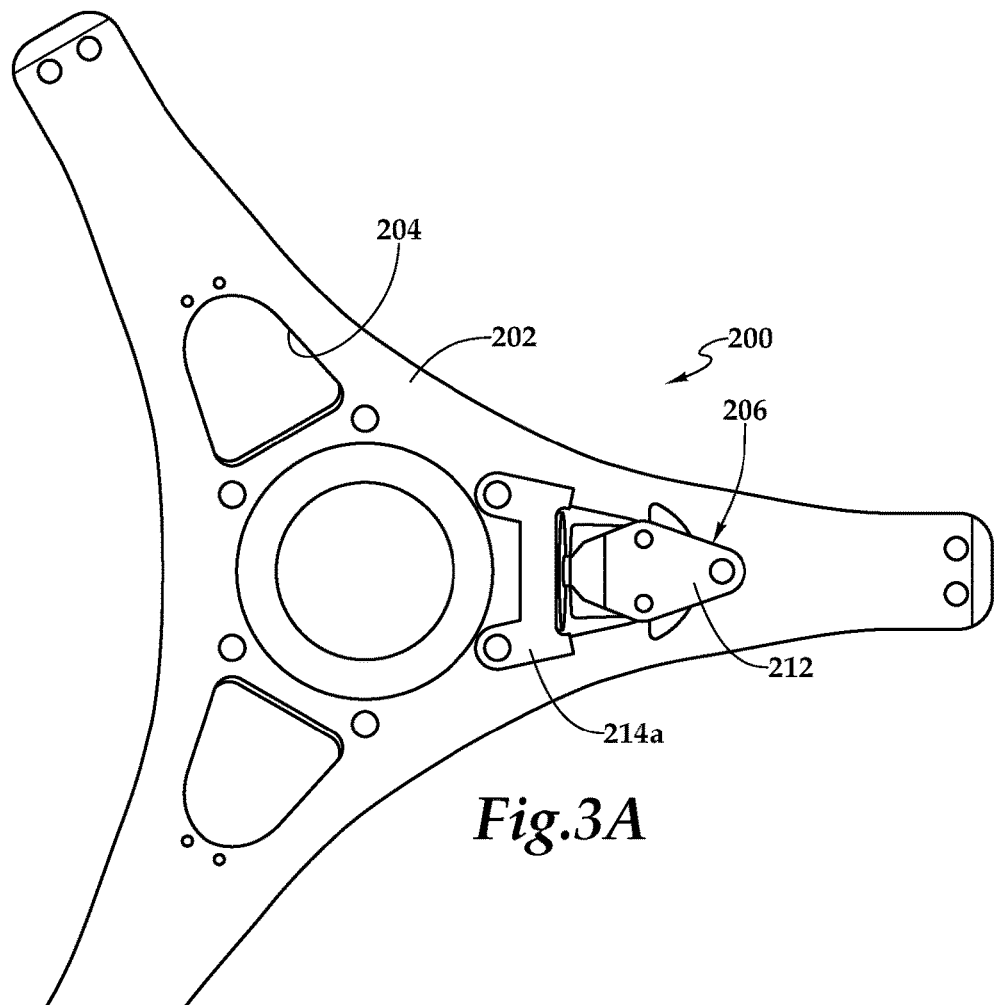
FIGS. 3A-3D are various views of a centrifugal force and shear bearing assembly disposed in an inboard pocket of a yoke for a proprotor system for use on a tiltrotor aircraft in accordance with embodiments of the present disclosure.
Figure 3B:
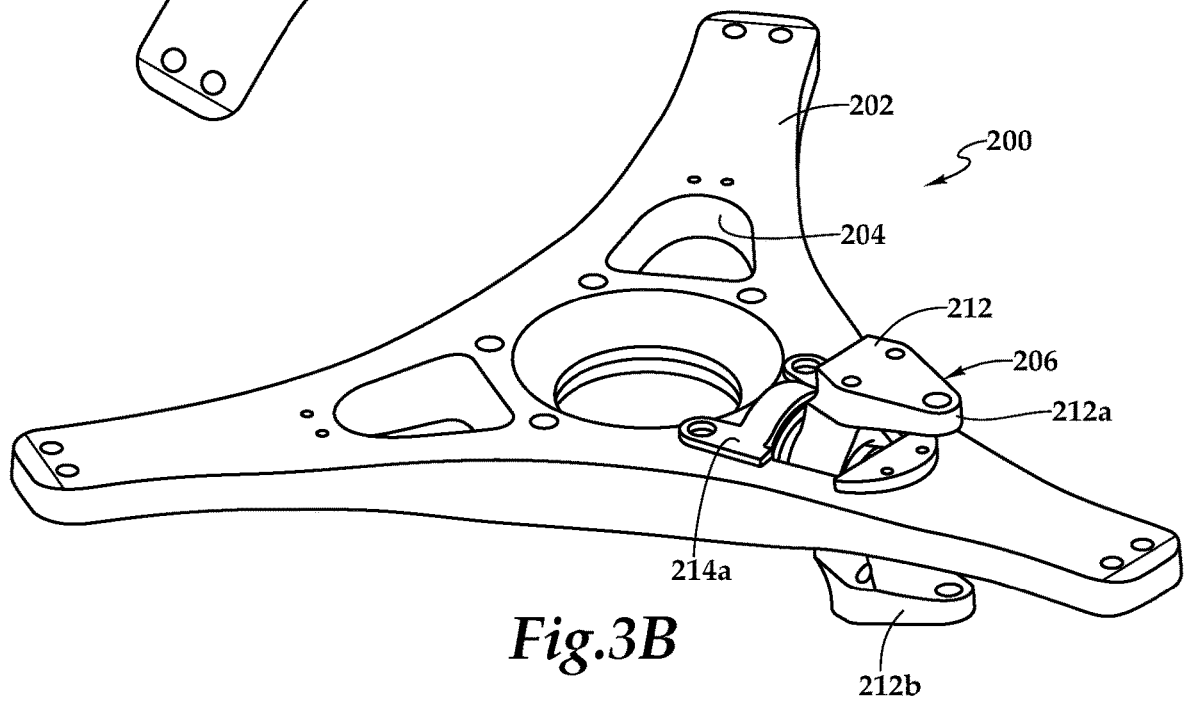
Figure 3C:
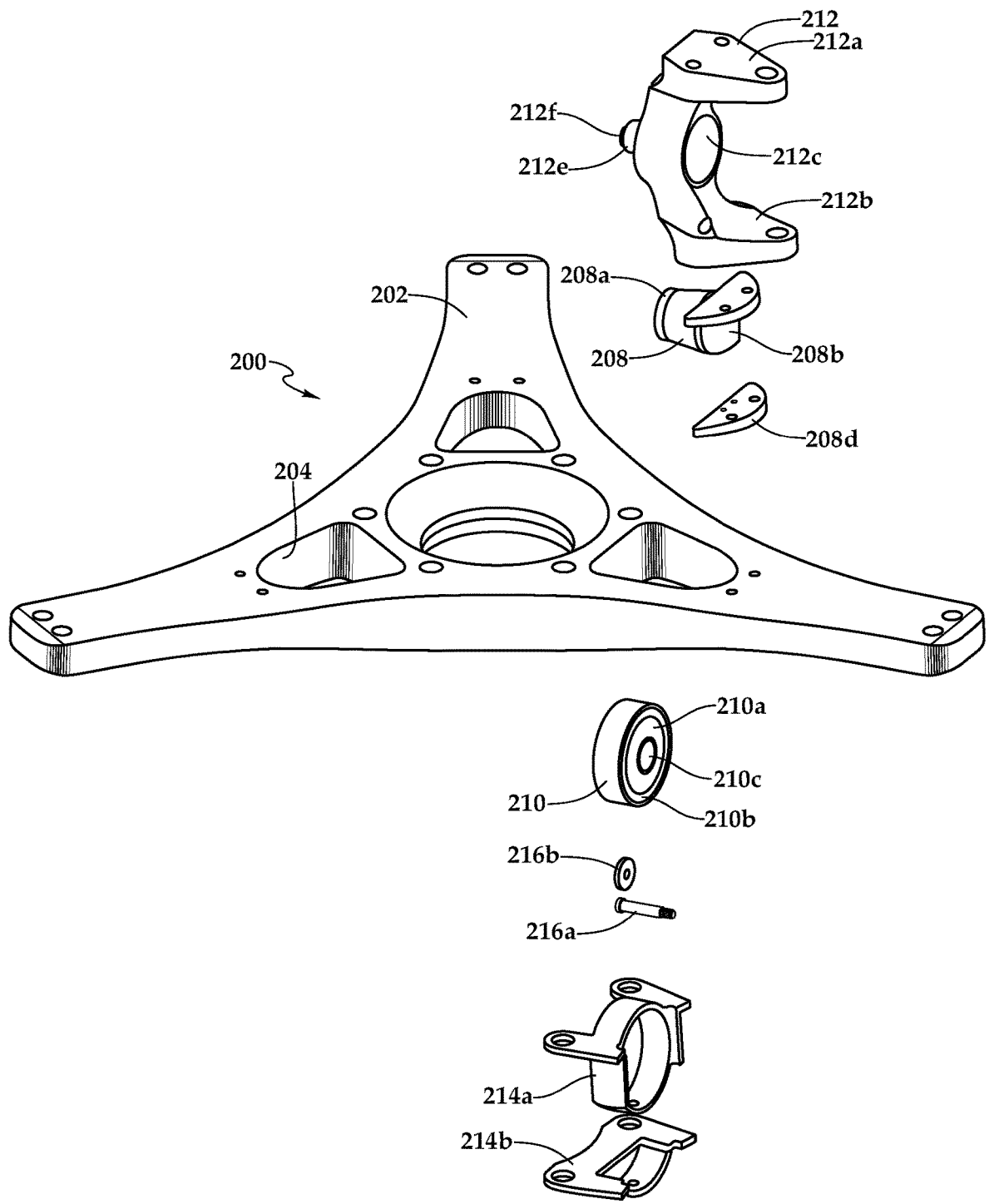
Figure 3D:
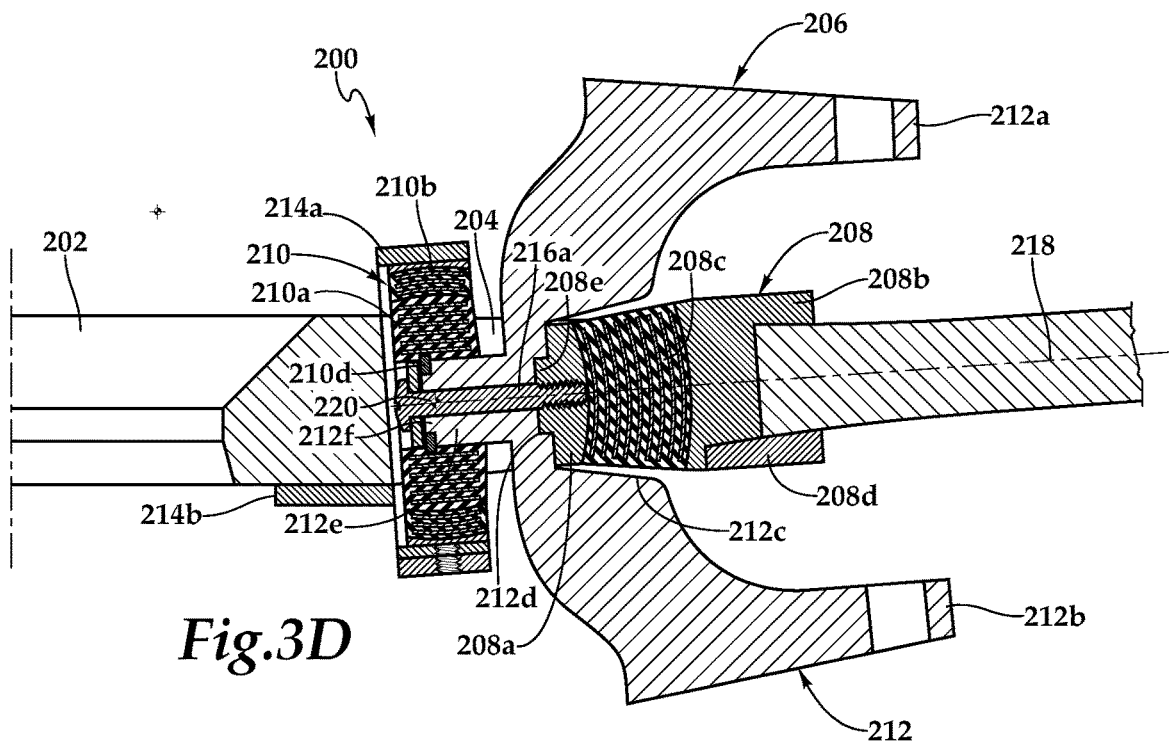
Figure 3E:
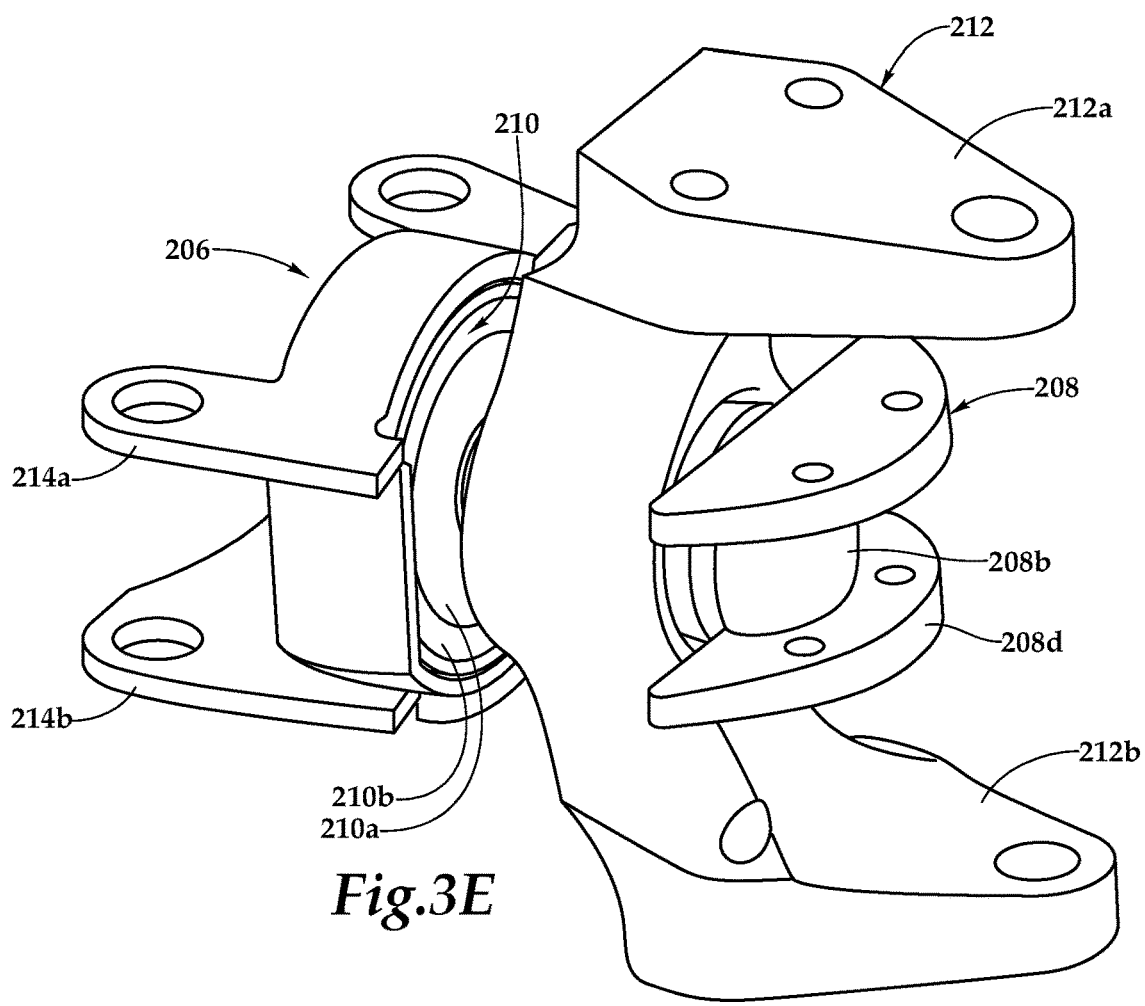
FIG. 3E is an isometric view of a centrifugal force and shear bearing assembly for a proprotor system for use on a tiltrotor aircraft in accordance with embodiments of the present disclosure.

As best seen in FIG. 3E, to install a centrifugal force and shear bearing assembly 206 in an inboard pocket 204 of yoke 202, clamp plate 214b and lower flange 208d of centrifugal force bearing 208 are removed such that the remainder of centrifugal force and shear bearing assembly 206 may be lowered into an inboard pocket 204. Once centrifugal force and shear bearing assembly 206 is disposed in an inboard pocket 204 lower flange 208d may be coupled to outboard member 208b by bolting or other suitable technique. Outboard member 208b may now be coupled to yoke 202 by bolting or other suitable technique. In addition, clamp plate 214b is coupled to clamp plate 214a by bolting or other suitable technique. Preferably, clamp plates 214a, 214b are coupled to yoke 202 with the same bolts that couple the constant velocity joint assembly to yoke 202 (see for example constant velocity joint assembly 108 of FIG. 2C). These connections secure centrifugal force and shear bearing assembly 206 in inboard pocket 204 of yoke 202.

As discussed herein, a proprotor blade is coupled to upper and lower arms 212a, 212b of inboard beam 212 by bolting or other suitable technique. As the proprotor blades engage in collective and/or cyclic blade pitch operations, inboard beam 212 must rotate therewith about pitch changes axis 218. During these rotary operations, inboard beam 212 causes inboard member 208a of centrifugal force bearing 208 to rotate relative to outboard member 208b due to the anti-rotation connection between inboard beam 212 and inboard member 208a as well as the fixed connection between outboard member 208b and yoke 202. Also during these rotary operations, inboard beam 212 causes rotation within journal bearing 210a and/or between journal bearing 210a and spherical bearing 210b due to the anti-rotation connection between inboard beam 212 and shear bearing 210 as well as the fixed connection between shear bearing 210 and yoke 202 created by clamp plates 214a, 214b. Thus, a proprotor blade coupled to centrifugal force and shear bearing assembly 206 has a pitch change degree of freedom about pitch change axis 218.

Centrifugal force bearing 208 is positioned outboard of shear bearing 210 and provides a centrifugal force retention path between a proprotor blade and yoke 202. As the proprotor blades engage in blade flap or out-of-plane movements and lead-lag or in-plane movements, spherical bearing 210b enables inboard beam 212 to tilt relative to yoke 202. In the illustrated embodiment, inboard beam 212 is operable to tilt relative to a focal point 220 associated with the spherical elements of spherical bearing 210b, which is preferably coincident with pitch change axis 218. Thus, a proprotor blade coupled to centrifugal force and shear bearing assembly 206 has a tilting degree of freedom about focal point 220.

Use of proprotor systems having the inboard centrifugal force and shear bearing assemblies of the present disclosure reduces the bearing count compared to conventional proprotor systems. The inboard centrifugal force and shear bearing assemblies of the present disclosure also dissipate heat faster than conventional centrifugal force bearings that are disposed outboard of the yoke and within the proprotor blades. In addition, locating the centrifugal force and shear bearing assemblies of the present disclosure in inboard stations enables visual inspection of the bearing assemblies without blade removal. Further, the inboard positioning of the centrifugal force and shear bearing assemblies of the present disclosure allows for compact blade fold options that reduce the tiltrotor aircraft footprint during storage.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor system for a tiltrotor aircraft having a helicopter flight mode and an airplane flight mode, the proprotor system comprising:
    a yoke having a plurality of blade arms including a first blade arm having an inboard pocket and an outboard end;
    an outboard shear bearing coupled to the outboard end of the first blade arm;
    a bearing assembly disposed at least partially within the inboard pocket, the bearing assembly including an inboard shear bearing coupled to the yoke and a centrifugal force bearing coupled to the yoke;
    an inboard beam disposed at least partially between the centrifugal force bearing and the inboard shear bearing; and
    a proprotor blade coupled to the inboard beam such that the proprotor blade has a pitch change degree of freedom about a pitch change axis and a tilting degree of freedom about a focal point.

2. The proprotor system as recited in claim 1 wherein, the centrifugal force bearing is positioned outboard of the inboard shear bearing.

3. The proprotor system as recited in claim 1 wherein, the inboard beam is operable to rotate relative to the yoke about the pitch change axis.

4. The proprotor system as recited in claim 1 wherein, the centrifugal force bearing further comprises:
    an outboard member coupled to the yoke and having a concave spherical surface;
    an inboard member coupled to the inboard beam and having a convex spherical surface; and
    a series of spherical elastomeric layers separated by inelastic shims between the outboard member and the inboard member.

5. The proprotor system as recited in claim 4 wherein, the inboard member of the centrifugal force bearing is operable to rotate relative to the outboard member of the centrifugal force bearing responsive to rotation of the inboard beam about the pitch change axis.

6. The proprotor system as recited in claim 1 wherein, the inboard shear bearing further comprises:
    a radially inwardly disposed journal bearing coupled to the inboard beam; and
    a radially outwardly disposed spherical bearing providing the tilting degree of freedom for the inboard beam relative to the yoke.

7. The proprotor system as recited in claim 6 wherein, the radially inwardly disposed journal bearing of the inboard shear bearing is operable to rotate relative to the radially outwardly disposed spherical bearing of the inboard shear bearing responsive to rotation of the inboard beam about the pitch change axis.

8. The proprotor system as recited in claim 1 wherein, the centrifugal force bearing is coupled to the inboard shear bearing.

9. The proprotor system as recited in claim 1 wherein a first in-plane frequency of the proprotor system is greater than 1.0/rev.

10. The proprotor system as recited in claim 1 wherein a first in-plane frequency of the proprotor system is between about 1.2/rev and about 1.8/rev.

11. The proprotor system as recited in claim 1 wherein a first in-plane frequency of the proprotor system is between about 1.4/rev and about 1.6/rev.

12. A tiltrotor aircraft having a helicopter flight mode and an airplane flight mode, the tiltrotor aircraft comprising:
    a fuselage;
    a wing extending from the fuselage having first and second outboard ends;
    first and second pylon assemblies respectively coupled to the wing proximate the first and second outboard ends; and
    first and second proprotor systems operably associated respectively with the first and second pylon assemblies, each proprotor system including:
    a yoke having a plurality of blade arms including a first blade arm having an inboard pocket and an outboard end;
    an outboard shear bearing coupled to the outboard end of the first blade arm;
    a bearing assembly disposed at least partially within the inboard pocket, the bearing assembly including an inboard shear bearing coupled to the yoke and a centrifugal force bearing coupled to the yoke;

an inboard beam disposed at least partially between the centrifugal force bearing and the inboard shear bearing; and a proprotor blade coupled to the inboard beam such that the proprotor blade has a pitch change degree of freedom about a pitch change axis and a tilting degree of freedom about a focal point.

13. The tiltrotor aircraft as recited in claim 12 wherein, the centrifugal force bearing is positioned outboard of the inboard shear bearing.

14. The tiltrotor aircraft as recited in claim 12 wherein the centrifugal force bearing further comprises:

an outboard member coupled to the yoke and having a concave spherical surface;

an inboard member coupled to the inboard beam and having a convex spherical surface; and a series of spherical elastomeric layers separated by inelastic shims between the outboard member and the inboard member; and wherein the inboard member is operable to rotate relative to the outboard member responsive to rotation of the inboard beam about the pitch change axis.

15. The tiltrotor aircraft as recited in claim 12 wherein, the inboard shear bearing further comprises:

a radially inwardly disposed journal bearing coupled to the inboard beam; and a radially outwardly disposed spherical bearing providing the tilting degree of freedom for the inboard beam relative to the yoke.

16. The tiltrotor aircraft as recited in claim 12 wherein, the centrifugal force bearing is coupled to the inboard shear bearing.

17. The tiltrotor aircraft as recited in claim 12 wherein a first in-plane frequency of each proprotor system is greater than 1.0/rev.

18. The tiltrotor aircraft as recited in claim 12 wherein a first in-plane frequency of each proprotor system is between about 1.2/rev and about 1.8/rev.

19. The tiltrotor aircraft as recited in claim 12 wherein a first in-plane frequency of each proprotor system is between about 1.4/rev and about 1.6/rev.

* * * * *